(Model.)
W. J. MORGAN & H. GLENN.
REIN HOLDER.
No. 262,816. Patented Aug. 15, 1882.
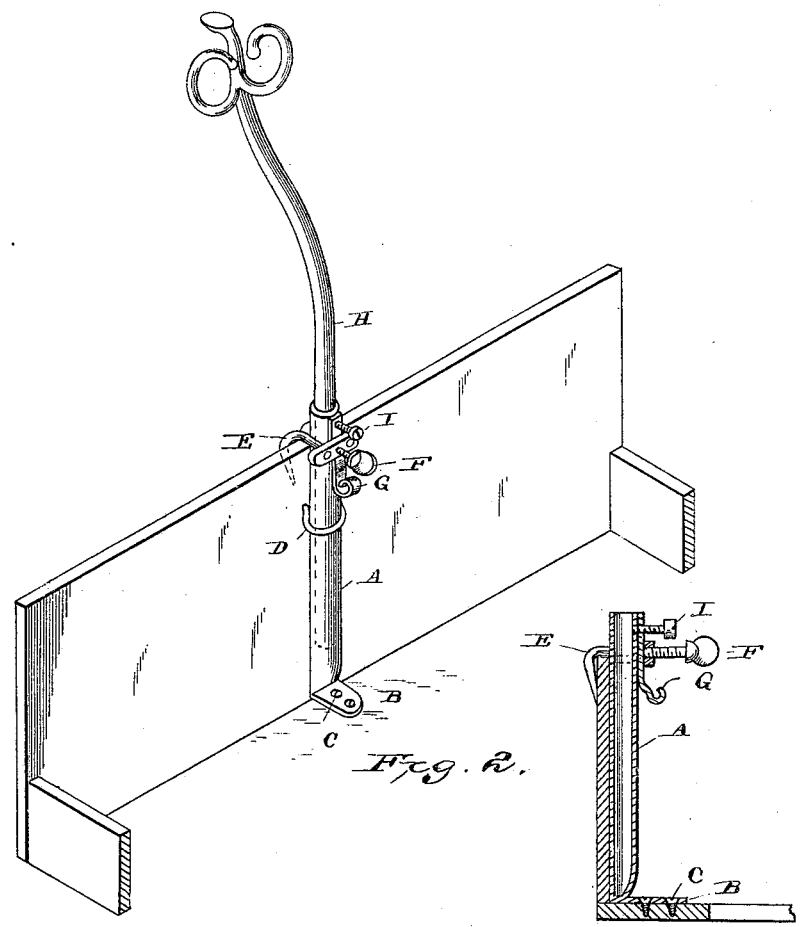

UNITED STATES PATENT OFFICE.

WILLIAM J. MORGAN AND HARRY GLENN, OF HILLSBOROUGH, OHIO.

REIN-HOLDER.

SPECIFICATION forming part of Letters Patent No. 262,816, dated August 15, 1882.

Application filed July 8, 1882. (Model.)

*To all whom it may concern:*

Be it known that we, WILLIAM J. MORGAN and HARRY GLENN, of Hillsborough, in the county of Highland, and in the State of Ohio, have invented certain new and useful Improvements in Rein-Holders; and we do hereby declare that the following is a full, clear, and exact description thereof, reference being had to the accompanying drawings, and to the letters of reference marked thereon, making a part of this specification.

This invention relates to certain improvements in that class of rein-holders which are designed to be attached to the dash-board of a vehicle; and it has for its object to provide an adjustable device that may be easily attached to any vehicle, and by means of which the reins may be elevated or lowered, according to the height of the horses, and held when the horses are at a stand, substantially as specified. These objects we attain by the means illustrated in the accompanying drawings, in which—

Figure 1 represents a perspective view of our device complete and attached to the vehicle; and Fig. 2 represents a detached sectional view, showing a portion of our device attached to the vehicle.

The letter A indicates a metallic tube, which is of a length slightly greater than the height of the dash-board. The said tube is bent at right angles at the lower end, or has otherwise formed upon it a foot, B, which can be secured to the bottom of the vehicle by means of screws C or other suitable fastening devices. The tube when in place sets close to the dash-board, and is fastened thereto near the top by a small wire loop, as indicated by the letter D, Fig. 1, or by means of a clasp, E, passing the dash-board, and secured by means of a nut-screw, F.

To the top of the tube is secured a spring-clasp, G, by means of which the reins may be held when the horse or horses are at a stand.

The letter H indicates a standard, the lower end of which is adapted to move vertically in the tube, and be adjusted to any desired position therein by means of one or more set-screws, I. The upper portion of the standard is bent or curved, as shown, and is provided at opposite sides with open rings or brackets, through which the reins may be passed.

It will be seen that as constructed the reins can be elevated out of the reach of the horses' tails and held in a graceful position while the animals are moving. Moreover, when the animals are standing the reins may be secured by means of the spring-clasp.

Having thus described our invention, what we claim, and desire to secure by Letters Patent, is—

In combination with the upright tube and the movable standard, provided with rein-rings at the top, the bifurcated clasp having hooked ends adapted to set over the upper rail of the dash-board, and a set-screw at the rear adapted to bear against the rein-holding spring attached to the tube, so as to hold the tube in place against the dash-board, substantially as specified.

In testimony whereof we affix our signatures, in presence of two witnesses, this 27th day of June, 1882.

WILLIAM J. MORGAN.
HARRY GLENN.

Witnesses:
GEO. A. BOVIS,
CHAS. N. HOLMES.